United States Patent
Paananen et al.

(10) Patent No.: US 7,009,076 B2
(45) Date of Patent: Mar. 7, 2006

(54) PROCESS FOR RECOVERING BETAINE

(75) Inventors: Hannu Paananen, Kantvik (FI); Heikki Heikkila, Espoo (FI); Outi Puuppo, Espoo (FI); Hannu Koivikko, Kantvik (FI); Kaj-Erik Monten, Lapinkylä (FI); Mika Manttäri, Lappeenrante (FI); Marianne Nyström, Lappeenranta (FI)

(73) Assignee: Finnfeeds Finland Oy, Espoo (FI)

( * ) Notice: Subject to any disclaimer, the term of this patent is extended or adjusted under 35 U.S.C. 154(b) by 295 days.

(21) Appl. No.: 10/373,476

(22) Filed: Feb. 25, 2003

(65) Prior Publication Data

US 2004/0006222 A1 Jan. 8, 2004

(30) Foreign Application Priority Data

Jun. 26, 2002 (FI) ............................................. 20021251

(51) Int. Cl.
*C07C 227/00* (2006.01)

(52) U.S. Cl. ........................... 562/554; 62/553; 62/606; 62/575; 62/576

(58) Field of Classification Search ................. 205/551; 512/553, 554; 564/281
See application file for complete search history.

(56) References Cited

U.S. PATENT DOCUMENTS

| | | |
|---|---|---|
| 4,333,770 A | 6/1982 | Neuzil et al. |
| 4,359,430 A | 11/1982 | Heikkila et al. |
| 4,405,377 A | 9/1983 | Neuzil |
| 4,405,378 A | 9/1983 | Kulprathipanja |
| 4,511,654 A | 4/1985 | Rohrbach et al. |
| 5,127,957 A | 7/1992 | Heikkila et al. |
| 5,177,008 A * | 1/1993 | Kampen ..................... 435/139 |
| 6,093,326 A | 7/2000 | Heikkila et al. |
| 6,329,182 B1 | 12/2001 | Pedersen et al. |
| 6,379,554 B1 | 4/2002 | Kearney et al. |
| 6,387,186 B1 * | 5/2002 | Reisig et al. .................. 127/55 |
| 2002/0169311 A1 * | 11/2002 | Paananen et al. ...... 536/123.13 |

FOREIGN PATENT DOCUMENTS

| | | |
|---|---|---|
| DE | OS 2362211 | 6/1975 |
| EP | B 0 411 780 | 2/1991 |
| FI | 20002866 | 12/2000 |
| FI | 200002865 | 12/2000 |
| WO | WO 96/10650 | 4/1996 |
| WO | WO-A 01/14594 | 3/2001 |
| WO | WO 99/28490 | 12/2001 |
| WO | WO 02/27037 A1 | 4/2002 |

* cited by examiner

*Primary Examiner*—Johann R. Richter
*Assistant Examiner*—Karl J. Puttlitz
(74) *Attorney, Agent, or Firm*—Scully, Scott, Murphy & Presser

(57) ABSTRACT

The invention relates to a separation process of fractionating a solution comprising betaine and sucrose by subjecting said solution to chromatographic fractionation and nanofiltration and recovering a fraction enriched in betaine and optionally a fraction enriched in sucrose. The solution to be fractionated in accordance with the present invention is typically a sugar beet-derived solution, for instance a molasses solution.

41 Claims, 2 Drawing Sheets

PROCESS FOR RECOVERING BETAINE

FIELD OF THE INVENTION

The present invention relates to a separation process for recovering betaine and more particularly to a separation process of fractionating a solution comprising betaine and sucrose using a combination of nanofiltration and chromatography. In a typical embodiment of the invention, betaine is recovered from a sugar beet-derived solution, such as molasses solution.

BACKGROUND OF THE INVENTION

Betaine is a valuable compound which is used in animal fodders, as well as in pharmaceutical and cosmetic applications.

Betaine occurs in the roots, seeds and stems of a great variety of plants. Its concentration in sugar beet is relatively high, 1.0% to 1.5% on a dry solids basis. When sugar beet is processed for the recovery of sucrose, betaine concentrates in the molasses. Beet molasses usually contains from 3% to 8% of betaine calculated on a dry solids basis.

Betaine is an amphoteric compound having the formula:

$$(H_3C)_3N^+-CH_2-COO^-$$

It is known in the art to recover betaine from beet molasses, rest molasses or vinasse by ion exchange, by crystallization as a hydrochloride, by extraction with an organic solvent, or by chromatography.

A chromatographic method for the recovery of betaine from beet molasses is decribed in U.S. Pat. No. 4,359,430 (Suomen Sokeri Oy). This method is a chromatographic process in which molasses which contains betaine, such as beet molasses, is introduced to the top of a column containing a polystyrene sulphonate cation exchange resin, typically in an alkali metal form. Elution with water is carried out for the recovery of betaine, sucrose and residual molasses from the downstream side of the resin bed.

Another process for the recovery of betaine from molasses has been described in U.S. Pat. No. 5,127,957 (Heikkilä et al.) using a chromatographic simulated moving bed system having at least three chromatographic columns connected in series. Betaine and sucrose are recovered as separate product fractions during the same cycle of the chromatographic simulated moving bed system. The columns of the chromatographic system are typically filled with a strong acid cation exchange resin in a monovalent ion form, preferably in sodium and/or potassium form.

A further process for the fractionation of molasses has been disclosed in U.S. Pat. No. 6,093,326 (Danisco Finland Oy). In this process, at least one product fraction is recovered during a multi-step sequence in two or more loops in a chromatographic simulated moving bed system. One embodiment of the process relates to a method of separating sucrose and betaine from molasses to recover a sucrose fraction and a betaine fraction. The chromatographic system comprises at least two partial packing material beds. The filling material of the columns is typically a strong acid, gel-type cation exchange resin in a monovalent ion form, preferably in sodium and/or potassium form.

WO 96/10650 (Cultor Oy) relates to a method for separating sucrose and additionally a second component, such as betaine, from a beet-derived sucrose-containing solution. The process comprises subjecting the solution to two successive chromatographic fractionations with a simulated moving bed method to yield one or more fractions enriched in sucrose and a fraction enriched in said second component. The chromatographic separation is typically carried out with a strong acid cation exchanger in sodium and/or potassium form.

DE-OS 2 362 211 (Süddeutsche Zucker AG) discloses a chromatographic separation process for separating molasses into a sugar fraction and a non-sugar fraction using a cation exchange resin in $Ca^{2+}$ form. The process has the disadvantage that the $Ca^{2+}$ form of the resin is not in equilibrium with the cation composition of the mobile phase.

U.S. Pat. No. 4,333,770 (UOP Inc.) discloses a process for separating sucrose from an aqueous mixture of a sugar source, such as molasses, by contacting said mixture with an adsorbent consisting of a carbonaceous pyropolymer. The process separates betaine from salts poorly. U.S. Pat. No. 4,405,377 (UOP Inc.) discloses a process for the separation of monosaccharides from a feed mixture comprising an aqueous solution of monosaccharides by contacting said solution with an adsorbent comprising crystalline aluminosilicate, such as zeolite. The feed mixture is diluted with ethanol before the adsorbent treatment. The feed mixture may be a starch syrup, such as corn syrup, for example. This process is not used for the separation of betaine. U.S. Pat. No. 4,405,378 (UOP Inc.) discloses a process for separating sucrose from an aqueous solution containing sucrose, betaine and/or mineral salts by contacting said solution with an adsorbent comprising activated carbon powder bound with an organic polymer (a cellulose nitrate, a cellulose ester or a mixture thereof). This process separates betaine from salts poorly.

U.S. Pat. No. 6,379,554 (Amalgamated Research Inc.) discloses a system where a plurality of chromatographic separation operations, including a first simulated moving bed operation, are coupled into a process which functions, preferably through the application of continuous displacement chromatography, to recover a fraction rich in small organic molecules, notably betaine and/or invert sugar from sucrose solutions, enabling the subsequent production of a high purity sucrose product.

EP 0 411780 (Kampen Willem Hemmo) discloses a process for the recovery of betaine from beet stillage produced from the fermentation and distillation of sugar beets. The process comprises the steps of a) clarifying the stillage product by using a cross-flow micro-filtration process with inorganic membranes having a pore size in the range of 0.1. to 10 μm to remove the solid substances and (b) subjecting the clarified stillage to chromatographic separation by ion exclusion for separating betaine. The chromatographic separation by ion exclusion may be carried out with a suitable resin material, such as SM-51-Na resin (IWT), IWT-AM-63 or DOWEX 50-WX8 (Dow Chemical). Other products, such as ethanol, glycerol, succinic acid, lactic acid, potassium sulphate and L-pyroglutamic acid may be recovered in the process, in addition to betaine.

Nanofiltration is a relatively new pressure-driven membrane filtration process for the separation of soluble components of the nanofiltration feed, falling between reverse osmosis and ultrafiltration. Nanofiltration typically retains divalent salts and organic molecules with a molar mass greater than 300 g/mol. The most important nanofiltration membranes are composite membranes made by interfacial polymerisation. Polyether sulfone membranes, sulfonated polyether sulfone membranes, polyester membranes, polysulfone membranes, aromatic polyamide membranes, polyvinyl alcohol membranes and polypiperazine membranes are examples of widely used nanofiltration membranes. Inorganic and ceramic membranes can also be used for nanofiltration.

It is known in the art to use nanofiltration for separating glucose from disaccharides and higher saccharides. The starting mixture including glucose may be a starch hydrolysate, for example. One process for separating glucose from disaccharides and higher saccharides by nanofiltration has been disclosed in WO 99/28490 (Novo Nordisk), for example.

U.S. Pat. No. 4,511,654 (UOP Inc.) relates to a process for the production of a high glucose or maltose syrup by treating a glucose/maltose-containing feedstock With an enzyme selected from amyloglucosidase and β-amylase to form a partially hydrolyzed reaction mixture, passing the resultant partially hydrolyzed reaction mixture through an ultrafiltration membrane to form a retentate and a permeate, recycling the retentate to the enzyme treatment stage, and recovering the permeate including the high glucose or maltose syrup.

WO 01/14594 A2 (Tate & Lyle Inc.) discloses a sugar beet membrane filtration process for producing sucrose from a sugar beet pulp. The membrane filtration can be done with an ultrafiltration membrane or a nanofiltration membrane, for example. In one embodiment of said process, the membrane filtration is carried out using two successive ultrafiltration steps optionally combined with diafiltration, followed by a nanofiltration step, thereby producing a nanofiltration permeate and a nanofiltration retentate. The nanofiltration retentate contains most of the sucrose from the beets. In a preferred embodiment of the process, the nanofiltration retentate contains at least about 89 to 91% by weight of sucrose (on dry substance basis). The nanofiltration permeate, on the other hand, is recited to contain at least about 25 to 50% of the betaine present in the nanofiltration feed. Loose nanofiltration membranes with NaCl rejection of about 10% are recited to be well suited for the nanofiltration step.

The above-mentioned reference WO 01/14594 A2 also proposes chromatographic separation for further purification of the sucrose-containing retentate obtained from the ultrafiltration/diafiltration. A purified sucrose fraction is thus obtained.

However, a combination of chromatography and nanofiltration to recover betaine from sugar beet-derived solutions have not been disclosed or suggested in the state of the art.

BRIEF DESCRIPTION OF THE INVENTION

It is thus an object of the present invention to provide a process for recovering betaine from a solution comprising betaine and sucrose, such as a sugar beet-derived solution, for instance molasses solution. The objects of the invention are achieved by a process which is characterized by what is stated in the independent claim. The preferred embodiments of the invention are disclosed in the dependent claims.

The invention is based on combining nanofiltration and chromatography for the recovery of betaine. The process of the invention provides an improved purity and/or yield of the final betaine product. Furthermore, besides betaine, other products can be recovered in the process with good yield and/or purity. By combining nanofiltration with chromatography in accordance with the present invention, the process economy and/or the separation efficiency of the total separation process can be improved.

BRIEF DESCRIPTION OF THE DRAWINGS

The following drawings are illustrative embodiments of the invention and are not meant to limit the scope of the invention in any way.

DETAILED DESCRIPTION OF THE INVENTION

The invention relates to a process of recovering betaine from a solution comprising betaine and sucrose by subjecting said solution to chromatographic fractionation and nanofiltration in any desired sequence and recovering a fraction enriched in betaine and optionally a fraction enriched in sucrose.

The process of the invention may also comprise further chromatographic fractionation and/or nanofiltration steps to recover a further fraction or further fractions enriched in betaine and optionally a further fraction or further fractions enriched in sucrose and/or other product fractions and/or mixtures thereof. In said further steps, the fractions obtained from the chromatographic fractionation and/or nanofiltration are subjected to further separations to further purify the product, to increase the yield and/or to recover other product fractions and/or mixtures thereof.

Said chromatographic fractionation and/or nanofiltration steps may be carried out successively in any desired sequence. The chromatographic fractionation and/or nanofiltration steps may also be carried out parallelly. The process may also comprise a combination of successive and parallel chromatographic fractionation and/or nanofiltration steps.

Said solution comprising betaine and sucrose is typically a sugar-beet derived solution, comprising solutions obtained from various stages of sugar beet processing and fractions obtained from chromatographic fractionation of sugar beet-derived juices. Said sugar beet-derived solution may be selected for example from beet juice, thick juice, final molasses and mother liquors from sugar crystallization.

An especially suitable raw material for betaine recovery is sugar beet molasses, which normally contains 3 to 8% of betaine on a dry solids basis. In addition to betaine, the beet molasses contain sucrose, salts, amino acids and other inorganic and organic components, for example.

In addition to molasses, both residual molasses from a desugarization process and vinasse from a fermentation process can be high in betaine and are naturally also very suitable raw materials.

In one embodiment of the invention, the process of the invention comprises the following steps:

(a) subjecting said solution comprising betaine and sucrose to chromatographic fractionation and recovering a fraction enriched in betaine and sucrose and optionally a residual fraction, (b) subjecting said fraction enriched in betaine and sucrose to nanofiltration and recovering a fraction enriched in betaine and optionally a fraction enriched in sucrose.

Figure 1:
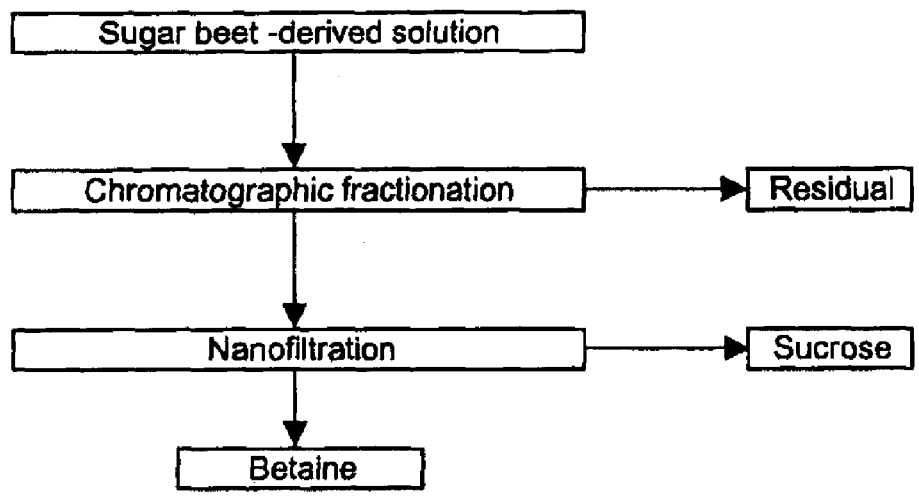
FIG. 1 is a graphical presentation of the embodiment of claim 6.

This embodiment of the invention is presented in FIG. 1.

The chromatographic fractionation of step (a) may be carried out as a batch process or a simulated moving bed process. The simulated moving bed process may be continuous or sequential. In one preferred embodiment, the chromatographic fractionation of step (a) is carried out as a continuous simulated moving bed process providing typically two fractions: a fraction enriched in betaine and sucrose and a residual fraction.

In the nanofiltration step (b), the fraction enriched in sucrose is typically obtained as the nanofiltration retentate and the fraction enriched in betaine is obtained as the nanofiltration permeate.

In this embodiment of the invention, the process may further comprise nanofiltration of said residual fraction obtained in step (a) and recovering a fraction enriched in betaine, a fraction enriched in sucrose, a fraction enriched in raffinose and/or a fraction enriched in colour compounds, depending on the composition of the residual fraction. In this way, the yield of betaine and/or sucrose may be increased.

Said colour compounds typically present as impurities in sugar beet-derived-solutions mainly comprise large molecules having a molar mass more than 1000 up to millions (g/mol).

Said fraction enriched in colour compounds (non-desired impurities) and said fraction enriched in raffinose are typically recovered as the nanofiltration retentate. The process may further comprise recovering the nanofiltration permeate, which may be returned to the chromatographic fractionation of step (a) for use therein as eluent.

Said fraction enriched in betaine and/or said fraction enriched in sucrose obtained from the nanofiltration step (b) may be subjected to one or more further nanofiltration and/or chromatographic fractionation steps to further purify the product and/or to increase the yield.

In another embodiment of the invention, the process comprises the following steps:

(a) subjecting said solution comprising betaine and sucrose to nanofiltration and recovering a fraction enriched in betaine and optionally a fraction enriched in sucrose, (b) subjecting said fraction enriched in betaine to chromatographic fractionation and recovering a fraction enriched in betaine and optionally a residual fraction and/or a fraction enriched in sucrose.

Figure 2:
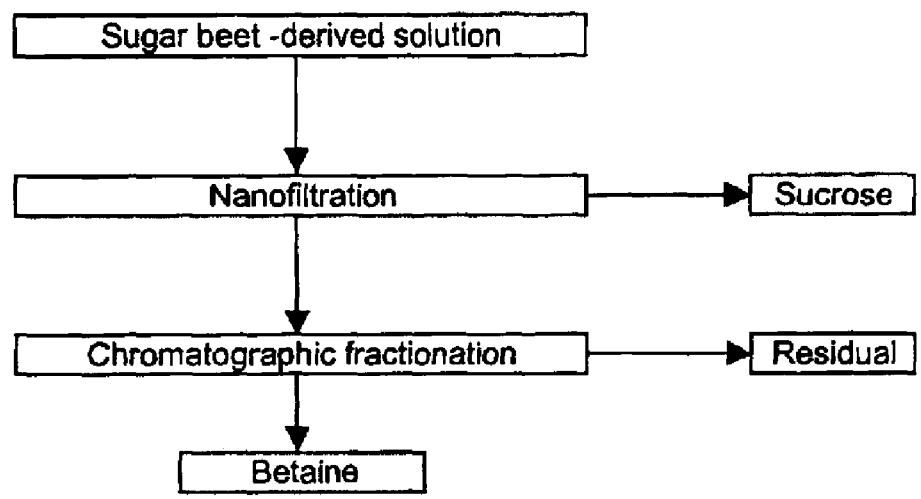
FIG. 2 is a graphical presentation of the embodiment of claim 7.

This embodiment of the invention is presented in FIG. 2.

In the nanofiltration step (a), said fraction enriched in betaine is typically recovered as the nanofiltration permeate and said fraction enriched in sucrose is recovered as the nanofiltration retentate.

In this embodiment of the invention, the chromatographic fractionation of step (b) may be carried out as a batch process or a simulated moving bed process. In a preferred embodiment, the chromatographic fractionation is carried out as a simulated moving bed process, which may be continuous or sequential.

This embodiment of the process of the invention may further comprise nanofiltration or chromatographic fractionation of said residual fraction obtained in step (b) and recovering a fraction enriched in betaine, a fraction enriched in sucrose, a fraction enriched in raffinose and/or a fraction enriched in colour compounds, depending on the composition of the residual fraction. In this way, the yield of betaine and/or sucrose can be increased.

Said fraction enriched in colour compounds (non-desired impurities) and said fraction enriched in raffinose are typically recovered as the nanofiltration retentate. The process may further comprise recovering the nanofiltration permeate, which may be returned to the chromatogragraphic fractionation of step (b) for use therein as eluent.

This embodiment of the process may further comprise a step, where said fraction enriched in betaine obtained from step (b) is subjected to nanofiltration and/or chromatography, where a second fraction enriched in betaine and optionally a further fraction are recovered. Said further fraction may include sugars, amino acids and inositol, for example. Sugars typically comprise sucrose, glucose, fructose and galactose. Sugars, amino acids and inositol may be further recovered as products.

Said fraction enriched in betaine and/or said fraction enriched in sucrose obtained from the nanofiltration step (a) may be subjected to one or more further nanofiltration steps to further purify the product and/or to increase the yield.

In a still further embodiment of the invention, the process comprises the following steps:

(a) subjecting said solution comprising betaine and sucrose to chromatographic fractionation and recovering a fraction enriched in betaine and optionally a fraction enriched in sucrose and/or a residual fraction, followed by at least one of the following steps:

(b) subjecting said residual fraction to nanofiltration and recovering a fraction enriched in sucrose and/or a fraction enriched in betaine and optionally one or more further fractions, (c) subjecting said fraction enriched in sucrose to nanofiltration and recovering a second fraction enriched in sucrose and/or a fraction enriched in betaine and optionally one or more further fractions, (d) subjecting said fraction enriched in betaine to nanofiltration and recovering a second fraction enriched in betaine and optionally one or more further fractions.

Figure 3:
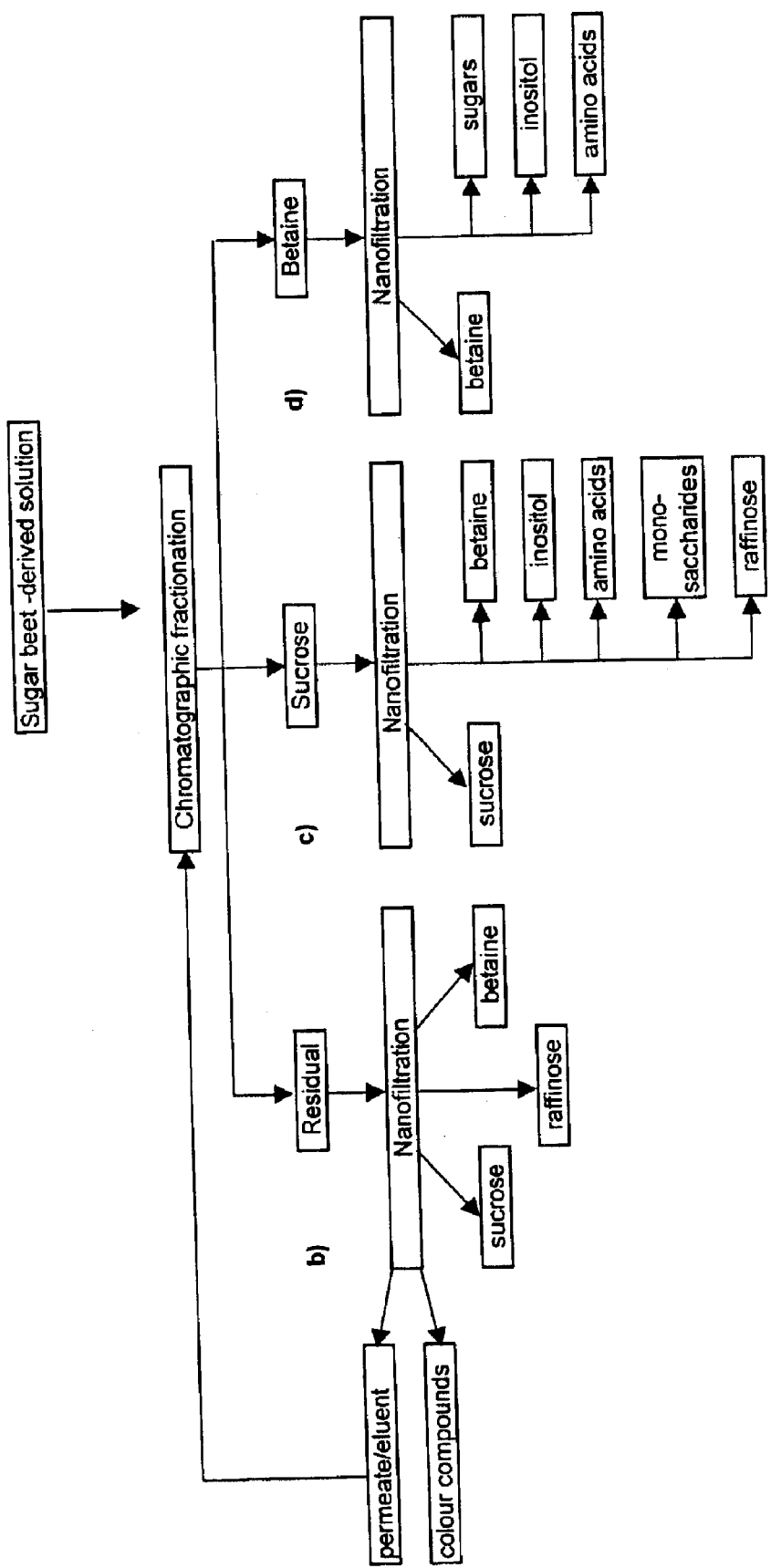
FIG. 3 is a graphical presentation of the embodiment of claim 8.

This embodiment of the invention is presented in FIG. 3.

The chromatographic fractionation of step (a) may be carried out as a batch process or a simulated moving bed process. The simulated moving bed process may be continuous or sequential. In a preferred embodiment, the chromatographic fractionation of step (a) is carried out as a sequential simulated moving bed process providing typically three fractions: a fraction enriched in betaine, a fraction enriched in sucrose and a residual fraction.

In this embodiment of the invention, the residual and/or sucrose and/or betaine fraction obtained from chromatographic fractionation (a) can be nanofiltered separately.

In step (b) of this embodiment of the invention, said one or more further fractions typically comprise a fraction enriched in raffinose and/or a fraction enriched in colour compounds. Depending on the residual fraction composition, betaine and sucrose are recovered to increase the overall yield, and also raffinose can be recovered. Said fraction enriched in raffinose and said fraction enriched in colour compounds are typically recovered as the nanofiltration retentate. Said fraction enriched in betaine is typically recovered as the nanofiltration permeate. The permeate obtained from nanofiltration may be used as eluent in chromatographic fractionation of step (a).

Said one or more further fractions recovered in step (c) of this embodiment of the invention typically comprise a fraction enriched in inositol, a fraction enriched in amino acids, a fraction enriched in monosaccharides and/or a fraction enriched in raffinose. Betaine, inositol, amino acids, monosaccharides and raffinose may be recovered as products. Said fraction enriched in raffinose is typically recovered as the nanofiltration retentate. Said fraction enriched in betaine is typically recovered as the nanofiltration permeate. At the same time, the sucrose fraction is further purified from betaine, inositol, amino acids, monosaccharides and raffinose.

Said further fraction recovered in step (d) of this embodiment of the invention may comprise a fraction enriched in sugars, a fraction enriched in inositol and/or a fraction enriched in amino acids. Sugars, inositol and amino acids may be recovered as products. At the same time, the betaine fraction is purified is further purified from sugars, inositol, amino acids and other possible compounds. By choosing the membrane or the membrane combinations correctly, the betaine fraction can be purified and concentrated simultaneously, which also decreases the evaporation need in the next stage.

Said residual fraction optionally recovered in various embodiments of the invention typically includes salts. The salts originate from the raw material, such as sugar beets, and from the earlier steps of processing the raw material. In accordance with the process of the invention, salts can thus be effectively removed from betaine and/or sucrose.

The chromatographic fractionation step of the process of the present invention may be carried out using a column packing material selected from cation exchange resins and anion exchange resins.

Said cation exchange resin may be a strongly acid cation exchange resin or a weakly acid cation exchange resin. The resin may be in a monovalent and/or divalent metal form, such as $Na^+$ and/or $K^+$ form, or $Ca^{2+}$, $Ba^{2+}$, $Mg^{2+}$ and/or $Sr^{2+}$ form.

The resins may have a styrene or acrylic skeleton. The resins are preferably cross-linked with from about 1 to about 20% divinylbenzene, preferably from about 3 to about 8% divinylbenzene.

Said anion exchange resin is typically a weakly basic anion exchange resin, having preferably an acrylic skeleton.

The average particle size of the resin is normally 10 to 2000 $\mu$m, preferably 100 to 400 $\mu$m.

The resins are preferably gel-type resins.

Manufacturers of resins are for example Finex, Dow, Bayer and Rohm & Haas.

Zeolites, carbonaceous pyropolymers and activated carbon bound to a polymer are also useful as column packing materials.

In the chromatographic fractionation operation, the cations/anions of the resin are preferably in substantial equilibrium with the cations/anions of the mobile phase of the system.

An especially preferred column packing material in the chromatographic fractionation step of the process of the invention is a strongly acid cation exchange resin in a monovalent metal form, which is predominantly in $Na^+$ and/or $K^+$ form. The resin has preferably a styrene skeleton, and the resin is preferably crosslinked with divinylbenzene.

The eluent used in the chromatographic separation step of the various embodiments of the invention described above is preferably water, but even solutions of salts and water are useful. Furthermore, alcohols, such as ethanol, and mixtures of water and alcohol, such as a mixture of water and ethanol are useful eluents.

The temperature of the chromatographic fractionation depends on the selected resin, for instance. The temperature in the chromatographic fractionation is typically in the range of 50 to 100° C., preferably 55 to 90° C.

In a simulated moving bed process, the chromatographic fractionation is typically carried out using 3 to 14 columns connected in series. The columns are interconnected with pipelines. Flow rate in the columns is typically 0.5 to 10 $m^3/(hm^2)$ of the cross-sectional area of the column. Columns are filled with a column packing material selected for example from those described above. The columns are provided with feed lines and product lines so that the feed solution and the eluent can be fed into the columns and the product fractions collected from the column. The product lines are provided with on-line instruments so that the quality/quantity of the production can be monitored during operation.

Before the chromatographic fractionation, the feed solution may be subjected to one or more pretreatment steps selected from softening by ion-exchange treatment or carbonation, dilution, concentration by e.g. evaporation, pH adjustment and filtration, for example. In a typical pretreatment operation, the feed solution, such as beet molasses, is diluted with water to a concentration of about 40 to 60% by weight and filtered using e.g. diatomaceous earth as filter aid. Before feeding into the columns, the feed solution and the eluent are heated to the fractionation temperature described above (for instance to a range of 50 to 85° C.).

During the chromatographic SMB separation, the feed solution is circulated through the columns by means of pumps. Eluent is added, and the saccharose, betaine and residual fractions as well as other optional product fractions are collected. In one example of the chromatographic fractionation of the process of the invention, the sucrose content of the sucrose fraction obtained may vary from about 85% to about 99% on the dry solids basis, and the betaine content of the sucrose fraction may vary from about 0.01% to about 10% on a dry solids basis. Betaine content of the betaine fraction may vary from about 20% to about 95% on a dry solids basis and sucrose content of the betaine fraction may vary from about 5% to about 40%. The sucrose content of the residual molasses fraction may vary from about 5 to about 25% on a dry solids basis, and the betaine content in the residual molasses fraction may vary from about 1% to about 35% on a dry solids basis.

The pH depends on the composition of the starting solution and the membrane used for the nanofiltration and the stability of the components to be recovered. If necessary, the pH of the starting solution is adjusted to the desired value before nanofiltration. The nanofiltration for recovering betaine is typically carried out at a pH of 1 to 12, preferably 4 to 12.

The nanofiltration is typically carried out at a pressure of 10 to 50 bar, preferably 15 to 35 bar. A typical nanofiltration temperature is 5 to 95° C., preferably 30 to 80° C. The nanofiltration for recovering betaine is typically carried out at a temperature of 5 to 95° C., preferably 30 to 80° C.

The nanofiltration is typically carried out with a flux of 5 to 100 $l/(m^2h)$.

The nanofiltration membrane used in the present invention can be selected from polymeric and inorganic membranes having a cut-off size of 100–2500 g/mol, preferably 150 to 1000 g/mol, most preferably 150 to 500 g/mol.

Typical polymeric nanofiltration membranes useful in the present invention include, for example, polyether sulfone membranes, sulfonated polyether sulfone membranes, polyester membranes, polysulfone membranes, aromatic polyamide membranes, polyvinyl alcohol membranes and polypiperazine membranes and combinations thereof. The nanofiltration membranes used in the present invention may also be selected from cellulose acetate membranes.

Typical inorganic membranes include $ZrO_2$- and $Al_2O_3$- membranes, for example.

The nanofiltration membranes which are useful in the present invention may have a negative or positive charge. The membranes may be ionic membranes, i.e. they may contain cationic or anionic groups, but even neutral membranes are useful. The nanofiltration membranes may be selected from hydrophobic and hydrophilic membranes.

One form of nanofiltration membranes is a flat sheet form. The membrane configuration may also be selected e.g. from tubes, spiral membranes and hollow fibers. "High shear" membranes, such as vibrating membranes and rotating membranes can also be used.

Before the nanofiltration procedure, the nanofiltration membranes may be pretreated with alkaline detergents or ethanol, for example.

In a typical nanofiltration operation, the liquor to be treated, such as a molasses liquor is fed through the nanofiltration membrane using the temperature and pressure conditions described above. The liquor is thus fractionated into a low molar mass fraction including betaine (permeate) and a high molar mass fraction including sucrose and other high-molecular components of the molasses solution (retentate).

The nanofiltration equipment useful in the present invention comprises at least one nanofiltration membrane element dividing the feed into a retentate and permeate section. The nanofiltration equipment typically also include means for controlling the pressure and flow, such as pumps and valves and flow and pressure meters and controllers. The equipment may also include several nanofiltration membrane elements in different combinations, arranged in parallel or series.

The flux of the permeate varies in accordance with the pressure. In general, at a normal operation range, the higher the pressure, the higher the flux. The flux also varies with the temperature. An increase of the operating temperature increases the flux. However, with higher temperatures and with higher pressures there is an increased tendency for a membrane rupture. For inorganic membranes, higher temperatures and pressures and higher pH ranges can be used than for polymeric membranes.

The nanofiltration in accordance with the present invention can be carried out batchwise or continuously. The nanofiltration procedure can be repeated once or several times. Recycling of the permeate and/or the retentate back to the feed vessel can also be used.

In addition to the chromatographic fractionation and nanofiltration steps described above, the process of the invention may comprise other treatments selected from softening by ion-exchange treatment or carbonation, dilution, concentration by e.g. evaporation, pH adjustment and filtration, for example, before, after and/or between the chromatographic fractionation and nanofiltration steps.

Betaine obtained from the chromatographic separation and/or nanofiltration described above may be concentrated by evaporation and then further purified by crystallization, ion exchange and/or other conventional purification methods.

In the examples and throughout the specification and claims, the following definitions have been used:

DS refers to the dry substance content measured by Karl Fischer titration, expressed as % by weight.

Flux refers to the amount (liters) of the solution that permeates through the nanofiltration membrane during one hour calculated per one square meter of the membrane surface, $l/(m^2h)$.

Retention refers to the proportion of the measured compound retained by the membrane. The higher the retention value, the less is the amount of the compound transferred through the membrane:

Retention (%)=[(Feed−Permeate)/Feed]×100, where "Feed" refers to the concentration of the compound in the feed solution (expressed e.g. in g/l) and "Permeate" refers to the concentration of the compound in the permeate solution (expressed e.g. in g/l).

HPLC refers to liquid chromatography.

SMB refers to simulated moving bed chromatography.

NF refers to nanofiltration.

DVB refers to divinylbenzene.

For instance the following membranes are useful in the present invention:

Desal-5 DK (a four-layered membrane consisting of a polyester layer, a polysulfone layer and two proprietary layers, having a cut-off size of 150 to 300 g/mol, permeability (25° C.) of 5.4 $l/(m^2h$ bar) and $MgSO_4$-retention of 98% (2 g/l), manufacturer Osmonics), Desal-5 DL (a four-layered membrane consisting of a polyester layer, a polysulfone layer and two proprietary layers, having a cut-off size of 150 to 300 g/mol, permeability (25° C.) of 7.6 $l/(m^2h$ bar), $MgSO_4$-retention of 96% (2 g/l), manufacturer Osmonics), NTR-7450 (a sulfonated polyethersulfone membrane having a cut-off size of 500 to 1000 g/mol, permeability (25° C.) of 9.4 $l/(m^2h$ bar), NaCl-retention of 51% (5 g/l), manufacturer Nitto Denko), and NF-200 (a polypiperazine membrane having a cut-off size of 200 g/mol, permeability (25° C.) of 7–8 $l/(m^2h$ bar), NaCl-retention of 70%, manufacturer Dow Deutschland), TS-80 (manufacturer Trisep), ATF-60 (manufacturer PTI Advanced Filtration Inc.), Desal AG (manufacturer Osmonics), Desal G10 (a thin film membrane of aromatic polyamide/polysulfone material having a cut-off-size of 2500 g/mol, permeability (25° C.) of 3.4 $l/(m^2h$ bar), NaCl-retention of 10%, retention of dextrane (1500 g/ml) of 95%, retention of glucose of 50%, manufacturer Osmonics), ASP 10 (a membrane consisting of sulfonated polysulfone on polysulfone, having a permeability (25° C.) of 16 $l/(m^2h$ bar), NaCl-retention of 10%, manufacturer Advanced Membrane Technology), TS 40 (a membrane consisting of fully aromatic polyamide, having a permeability (25° C.) of 5.6 $l/(m^2h$ bar), manufacturer TriSep), ASP 20 (a membrane consisting of sulfonated polysulfone on polysulfone, having a permeability (25° C.) of 12.5 $l/(m^2h$ bar), NaCl-retention of 20%, manufacturer Advanced Membrane Technology), UF-PES-4H (a membrane consisting of polyethersulfone on polypropylene, having a cut-off size of about 4000 g/mol, a permeability (25° C.) of 7 to 17 $l/(m^2h$ bar), manufacturer Hoechst), NF-PES-10 (a polyethersulfone membrane, havig a cut-off size of 1000 g/mol, a permeability (25° C.) of 5 to 11 $l/(m^2h$ bar), NaCl-retention less than 15% (5 g/l), manufacturer Hoechst), NF45 (a membrane consisting of aromatic polyamide, having a permeability (25° C.) of 4.8 $l/(m^2h$ bar), NaCl-retention of 45%, manufacturer Dow Deutschland), SR-1 (manufacturer Koch), XN-40 (manufacturer Trisep), MPF-34 (a composite membrane having a cut-off size of 200 g/mol and a glucose retention of 95% for a 5% glucose solution, manufacturer Koch).

Preferred nanofiltration membranes for the recovery of betaine are selected from sulfonated polysulfone membranes and polypiperazine membranes. For example, specific useful membranes are: Desal-5 DK and Desal-5 DL nanofiltration membranes (manufacturer Osmonics), NF-45 and NF-200 nanofiltration membrane (manufacturer Dow Deutschland), SR-1 nanofiltration membrane (manufacturer Koch) and NTR-7450 nanofiltration membrane (manufacturer Nitto Denko), for example.

The following examples illustrate the invention. The examples are not construed to limit the invention in any manner.

EXAMPLE 1

Separation of Betaine and Sucrose by Nanofiltration

This example illustrates the separation of betaine and sucrose using various nanofiltration membranes. The feed solution used for the nanofiltration was a solution made from sucrose and betaine crystals, containing 50% betaine and 50% sucrose. The feed had a pH of 9.2 and DS of 12.7%. The equipment used for the nanofiltration was DSS Labsta M20-filter. The nanofiltration was carried out using total recycling mode filtration (constant feed concentration). The nanofiltration pressure was 30 bar, the cross-flow velocity about 0.7 m/s and the temperature 65 to 70° C. The membranes used for the nanofiltration are set forth in Table 1 below.

Table 1 shows the content of betaine (%) in the permeate based on chromatographic analysis (the sum of sucrose and betaine is 100%).

TABLE 1

Content of betaine in the permeate obtained from the nanofiltration of a solution containing betaine and sucrose

| Membrane | The content of betaine in the permeate, % on DS |
|---|---|
| Desal-5 DL | 96 |
| NF-45 | 94 |
| SR-1 | 84 |
| NF-200 | 69 |
| XN-40 | 89 |

The results show that nanofiltration significantly increases the betaine content in the dry substance of the nanofiltration permeate.

EXAMPLE 2

Fractionation of Beet Molasses by Chromatography

A pilot scale sequential SMB chromatographic equipment was used in the fractionation. The equipment consisted of 6 columns in series, a feed pump, circulation pumps and a pump for eluent water as well as inlet and product valves for the process streams. Each column had a height of 4.0 m and a diameter of 0.111 m. Columns were packed with a strong acid gel type cation exchange resin in $Na^+$-form, mean particle size of the resin was 0.36 mm and DVB-content 5.5%. Temperature of the columns was 80° C. and water was used as eluent. Prior to chromatographic separation, the beet molasses was carbonated with sodium carbonate (dosage 1.5% on dry substance, temperature 60° C. and reaction time 3 h) and filtered with Seitz filter press using Kenite 300 as filter aid (precoat 1 kg/m², body feed 1.0% on dry substance).

Chromatographic separation was carried out in 9-step sequence as follows (operations a, b and c take place simultaneously):

Step 1: Feed was pumped into column 1 and a dilution fraction was eluted from column 6

Step 2a: Feed was pumped into column 1 and a residual fraction was eluted from column 1

Step 2b: Water was fed into column 2 and a residual fraction was eluted from column 4

Step 2c: Water was fed into column 5 and a dilution fraction was eluted from column 6

Step 3a: Feed was pumped into column 1 and a residual fraction was eluted from column 1

Step 3b: Water was fed into column 2 and a residual fraction was eluted from column 4

Step 3c: Water was fed into column 5 and a sucrose fraction was eluted from column 6

Step 4: Feed was pumped into column 1 and a sucrose fraction was eluted from column 6

Step 5: Water was fed into column 1 and a betaine-rich sucrose fraction for nanofiltration was eluted from column 6

Step 6a: Water was fed into column I and a residual fraction was eluted from column 2

Step 6b: Water was fed into column 3 and a residual fraction was eluted from column 5

Step 6c: Water was fed into column 6 and a betaine fraction was eluted from column 6

Step 7: Water was fed into column 1 and a betaine fraction was eluted from column 6

Step 8a: Water was fed into column 1 and a residual fraction was eluted from column 3

Step 8b: Water was fed into column 4 and a residual fraction was eluted from column 6

Step 9: Circulation in all columns

Volumes and flow rates in different steps are shown in Table 2.

TABLE 2

| | Volumes (liters) and flow-rates (liters/h) in steps 1–9 | | | | | | | | | | | | | | |
|---|---|---|---|---|---|---|---|---|---|---|---|---|---|---|---|
| | 1 | 2a | 2b | 2c | 3a | 3b | 3c | 4 | 5 | 6a | 6b | 6c | 7 | 8a | 8b | 9 |
| Feed | 3.0 | 1.3 | — | — | 6.5 | — | — | 4.3 | — | — | — | — | — | — | — | — |
| Residual | — | 1.3 | 1.2 | — | 6.5 | 7.7 | — | — | — | 9.3 | 9.3 | — | — | 9.1 | 9.1 | — |
| Dilution | 3.0 | — | — | 3.0 | — | — | — | — | — | — | — | — | — | — | — | — |
| Sucrose | — | — | — | — | — | — | 12.6 | 4.3 | — | — | — | — | — | — | — | — |
| Sucrose to NF | — | — | — | — | — | — | — | — | 6.9 | — | — | — | — | — | — | — |
| Betaine | — | — | — | — | — | — | — | — | — | — | — | 4.0 | 12.2 | — | — | — |
| Circulation | — | — | — | — | — | — | — | — | — | — | — | — | — | — | — | 9.3 |
| Flow rate | 40.0 | 30.0 | 27.7 | 69.2 | 30.0 | 35.5 | 58.2 | 40.0 | 55.0 | 55.0 | 55.0 | 23.7 | 55.0 | 55.0 | 55.0 | 55.0 |

Steps 1–9 were repeated (5 to 7 times) until an essential equilibrium was reached. The process was continued in the equilibrium stage. The fractions were collected and analyzed with HPLC (Na$^+$-form resin, 0.8 ml/min, 0.002 M Na2SO4, 85° C.). The compositions of the feed and the fractions collected are shown in Table 3.

TABLE 3

Concentration and composition of the feed and the fractions collected

|  | Feed | Combined Residual | Dilution | Sucrose | Sucrose to NF | Betaine |
|---|---|---|---|---|---|---|
| Concentration, g/100 ml | 68.4 | 4.9 | 15.6 | 32.9 | 11.3 | 3.2 |
| Sucrose, % on DS | 63.1 | 8.6 | 49.5 | 94.2 | 83.7 | 0.1 |
| Betaine, % on DS | 5.9 | 0.2 | 0.0 | 0.0 | 14.2 | 95.6 |
| Others, % on DS | 31.0 | 91.2 | 50.5 | 5.8 | 2.1 | 4.4 |

EXAMPLE 3

Nanofiltration of a Betaine-Rich Sucrose Fraction Obtained from Chromatographic Separation The betaine-rich sucrose fraction containing 80.9% sucrose and 14.5% betaine obtained according to Example 2 was subjected to nanofiltration.

The nanofiltration was carried out using the same equipment as in Example 1. The nanofiltration feed had a DS of 15.6 g/100 ml, the nanofiltration temperature was 70° C. and the nanofiltration pressure was 28 bar. The nanofiltration membranes were Desal-5 DL and Desal-5 DK. The content of betaine in the nanofiltration permeate obtained from the nanofiltration with Desal 5DL was 65.4% and the content of sucrose in the permeate was 31.1% on DS. When using Desal-5 DK as the nanofiltration membrane, the content of betaine in the nanofiltration permeate thus obtained was 61.2% and the content of sucrose in the permeate was 31.3% on DS.

EXAMPLE 4

Nanofiltration of a Sucrose-Rich Betaine Fraction Obtained from Chromatographic Separation Beet molasses was subjected to chromatographic fractionation as described in Example 2 and a sucrose-rich betaine fraction containing 17.9% sucrose on DS and 76.6% betaine on DS was collected. The solution thus obtained was pretreated by adjusting the concentration of the solution to 17.3 g/100 ml, whereafter it was subjected to nanofiltration.

The nanofiltration was carried out using the same equipment as in Example 1. The nanofiltration feed had a DS of 15.3 g/100 ml, the nanofiltration temperarature was 70° C. and the nanofiltration pressure was 48 bar. The nanofiltration membranes were Desal-5 DL and Desal-5 DK. The content of betaine in the nanofiltration permeate obtained from the nanofiltration with Desal-5 DL was 79.2% and the content of sucrose was 1.5% on DS. When using Desal-5 DK as the nanofiltration membrane, the content of betaine in the nanofiltration permeate thus obtained was 81.3% and the content of sucrose in the permeate was 1.3% on DS.

The betaine fraction obtained from chromatographic separation was thus purified by nanofiltration to obtain a nanofiltration permeate containing only minor amounts of sucrose. At the same time, sucrose was recovered from the betaine fraction by concentrating it into the nanofiltration retentate.

EXAMPLE 5

Chromatographic Fractionation of Beet Molasses

A pilot scale sequential SMB chromatographic equipment was used in the fractionation. The equipment consisted of three columns in series, a feed pump, circulation pumps and a pump for eluent water as well as inlet and product valves for the process streams. The columns had a total length of 11.1 m (columns 1, 2 and 3 had a length of 4.35 m, 2.70 m and 4.05 m, respectively) and a column diameter of 0.20 m. Columns were packed with a strong acid gel type cation exchange resin in Na$^+$ form, mean particle size of the resin was 0.41 mm and DVB-content 6.5%. The temperature of the columns was 80° C. and water was used as eluent. Prior to the chromatographic separation, the feed liquor was filtered with Seitz pressure filter using Kenite 300 as filter aid (precoat 1 kg/m$^2$, body feed 1% on dry substance).

Chromatographic separation was carried out in a 7-step sequence as follows (operations a, b and c take place simultaneously):

Step 1a: Feed was pumped into column 1 and a residual fraction was eluted from column 2

Step 1b: Water was fed into column 3 and a betaine fraction was eluted from column 3

Step 2: Feed was pumped into column 1 and a betaine fraction was eluted from column 3

Step 3: Circulation in all columns

Step 4a: Water was fed into column 1 and a residual fraction was eluted from column 1

Step 4b: Water was fed into column 2 and a residual fraction was eluted from column 3

Step 5: Water was fed into column 1 and a residual fraction was eluted from column 3

Step 6: Water was fed to into column 1 and a fraction containing sucrose and betaine was eluted from column 3

Step 7: Water was fed into column 3 and a residual fraction was eluted from column 2

Volumes and flow rates in different steps are shown in Table 4.

TABLE 4

Volumes (liters) and flow-rates (liters/h) in steps 1–7.

|  | 1a | 1b | 2 | 3 | 4a | 4b | 5 | 6 | 7 |
|---|---|---|---|---|---|---|---|---|---|
| Feed | 3.0 | — | 20.0 | — | — | — | — | — | — |
| Residual | 3.0 | — | — | — | 18.0 | 18.0 | 22.0 | — | 18.0 |
| Betaine | — | 32.0 | 20.0 | — | — | — | — | — | — |
| Sucrose + betaine to NF | — | — | — | — | — | — | — | 6.0 | — |
| Circulation | — | — | — | 22.0 | — | — | — | — | — |
| Flow rate | 75.0 | 140.0 | 100.0 | 115.0 | 115.0 | 115.0 | 115.0 | 115.0 | 115.0 |

Steps 1 to 7 were repeated (5 to 7 times) until equilibrium was reached. The process was continued in the equilibrium state. Fractions were collected and analyzed with HPLC (Na$^+$ form resin, 0.8 ml/min, 0.002 M Na$_2$SO$_4$, 85° C.). The compositions of the feed and the fractions collected are shown in Table 5.

TABLE 5

Concentration and composition of the feed and the fractions collected.

|  | Feed | Sucrose + betaine to NF | Residual | Betaine |
|---|---|---|---|---|
| Concentration, g/100 ml | 50.2 | 6.7 | 4.5 | 14.4 |
| Sucrose, % on DS | 17.1 | 54.3 | 42.0 | 0.9 |
| Betaine, % on DS | 48.6 | 6.0 | 0.3 | 85.9 |
| Others, % on DS | 34.3 | 39.7 | 50.7 | 13.2 |

EXAMPLE 6

Nanofiltration of a Fraction Containing Sucrose and Betaine Obtained from Chromatographic Fractionation The fraction containing 45.9% sucrose and 5.1% betaine obtained from the chromatographic fractionation made according to Example 5 was subjected to nanofiltration.

The nanofiltration was carried out with the same equipment as in Example 1. The nanofiltration conditions were the following: pH 10.1, temperature 70° C., cross-flow velocity about 0.5 m/s. The nanofiltration membrane was Desal-5 DL. The nanofiltration was carried out using the diafiltration mode. It was stopped when about 50% of the original dry solids was passed through the membrane. The feed volume was 5 liters and the volume of the concentrate in the end was 3.6 liters.

The composition of the feed and the permeate obtained from the nanofiltration are set forth in Table 6. The retentions are set forth in Table 7.

TABLE 6

Feed and permeate composition in the nanofiltration

|  |  | % on DS | | | | | | % on DS | | | | | |
|---|---|---|---|---|---|---|---|---|---|---|---|---|---|
| NF | RDS, % | Raffinose | Sucrose | Glucose | Inositol | Betaine | Amino acids | Na | K | Ca | Cl | NO3 | SO4 |
| Feed | 13.3 | 0.7 | 45.9 | 2.0 | 0.3 | 5.1 | 21.9 | 3.65 | 4.57 | 0.02 | 0.18 | 0.17 | 0.12 |
| Desal-5 DL (1) | 8.71 | 0.0 | 18.0 | 4.7 | 0.4 | 9.4 | 39.4 | 3.20 | 5.14 | 0.01 | 0.39 | 0.35 | 0.03 |
| Feed | 20.36 | 1.4 | 55.1 | 0.7 | 0.2 | 2.2 | 14.7 | 1.22 | 1.46 | 0.03 | <0.005 | 0.01 | 0.14 |
| Desal-5 DL (2) | 2.33 | 0.0 | 14.3 | 3.4 | 0.3 | 7.1 | 39.8 | 4.27 | 4.91 | 0.01 | 0.13 | 0.11 | <0.086 |

TABLE 7

Retentions and feed composition in the nanofiltration

| NF | Flux, l/(m$^2$h) | Pressure, bar | Feed composition, | Raffinose | Sucrose | Glucose | Inositol | Betaine | Amino acids | Na | K | Cl | NO3 |
|---|---|---|---|---|---|---|---|---|---|---|---|---|---|
|  | 8 | 20 | % on DS | 1.08 | 50.54 | 1.35 | 0.24 | 3.66 | 18.30 | 3.65 | 4.57 | 0.18 | 0.17 |
|  |  |  | Retention | 100% | 89% | −8% | 52% | 20% | 29% | 42.7% | 26.5% | −37.0% | −31.4% |

EXAMPLE 7

Chromatographic Fractionation of Beet Molasses

A pilot scale sequential SMB chromatographic equipment was used in the fractionation. The equipment, the resin and the conditions used for the chromatography were as described in Example 2, except that the chromatographic separation was carried out according to the following 9-step sequence (operations a, b and c take place simultaneously):

Step 1: Feed was pumped into column 1 and a dilution fraction was eluted from column 6

Step 2a: Feed was pumped to into column 1 and a residual fraction was eluted from column 1

Step 2b: Water was fed into column 2 and a residual fraction was eluted from column 4

Step 2c: Water was fed into column 5 and a dilution fraction was eluted from column 6

Step 3a: Feed was pumped into column 1 and a residual fraction was eluted from column 1

Step 3b: Water was fed into column 2 and a residual fraction was eluted from column 4

Step 3c: Water was fed into column 5 and a sucrose fraction was eluted from column 6

Step 4: Feed was pumped into column 1 and a sucrose fraction was eluted from column 6

Step 5: Water was pumped into column 1 and a fraction containing sucrose and betaine (a sucrose+betaine fraction) was eluted from column 6

Step 6a: Water was fed into column 1 and a residual fraction was eluted from column 2

Step 6b: Water was fed into column 3 and a residual fraction was eluted from column 5

Step 6c: Water was fed into column 6 and a betaine fraction was eluted from column 6

Step 7: Water was fed into column 1 and a betaine fraction was eluted from column 6

Step 8a: Water was fed into column 1 and a residual fraction was eluted from column 3

Step 8b: Water was fed into column 4 and a residual fraction was eluted from column 6

Step 9: Circulation in all columns

TABLE 8

Volumes (liters) and flow-rates in steps 1–9.

| | 1 | 2a | 2b | 2c | 3a | 3b | 3c | 4 | 5 | 6a | 6b | 6c | 7 | 8a | 8b | 9 |
|---|---|---|---|---|---|---|---|---|---|---|---|---|---|---|---|---|
| Feed | 3.0 | 1.3 | — | — | 6.5 | — | — | 4.3 | — | — | — | — | — | — | — | — |
| Residual | — | 1.3 | 1.2 | — | 6.5 | 8.3 | 10.2 | — | — | 9.5 | 9.5 | — | — | 9.5 | 9.5 | — |
| Dilution | 3.0 | — | — | 3.0 | — | — | — | — | — | — | — | — | — | — | — | — |
| Sucrose | — | — | — | — | — | — | — | 4.3 | — | — | — | — | — | — | — | — |
| Sucrose + Betaine to NF | — | — | — | — | — | — | — | — | 6.9 | — | — | — | — | — | — | — |
| Betaine | — | — | — | — | — | — | — | — | — | — | — | 4.0 | 12.2 | — | — | — |
| Circulation | — | — | — | — | — | — | — | — | — | — | — | — | — | — | — | 9.3 |
| Flow-rate | 40.0 | 30.0 | 27.7 | 69.2 | 40.0 | 51.1 | 62.8 | 40.0 | 55.0 | 55.0 | 55.0 | 23.2 | 55.0 | 55.0 | 55.0 | 55.0 |

Steps 1–9 were repeated (5 to 7 times) until equilibrium was reached. The process was continued in the equilibrium state. Fractions were collected and analyzed with HPLC ($Na^+$-form resin, 0.8 ml/min, 0.002 M Na2SO4, 85° C.). The concentration and the composition of the feed and the fractions collected are shown in Table 9.

TABLE 9

Concentration and composition of the feed and fractions collected.

| | Feed | Combined residual | Dilution | Sucrose | Sucrose + betaine to NF | Betaine |
|---|---|---|---|---|---|---|
| Concentration g/100 ml | 68.4 | 5.1 | 17.8 | 34.5 | 12.7 | 3.3 |
| Sucrose, % on DS | 63.1 | 10.7 | 60.8 | 95.9 | 87.5 | 0.1 |
| Betaine, % on DS | 5.9 | 0.2 | 0.0 | 0.0 | 11.0 | 94.6 |
| Others, % on DS | 31.0 | 89.1 | 39.2 | 4.1 | 1.6 | 5.3 |

EXAMPLE 8

Nanofiltration of a Fraction Containing 88% Sucrose and 10% Betaine, Obtained from Chromatographic Separation The fraction containing 88% sucrose and 10% betaine (the sucrose+betaine fraction) obtained from the chromatographic fractionation made according to Example 7 was subjected to nanofiltration. The nanofiltration was carried out with the same equipment as in Example 1, the nanofiltration membrane was NTR-7450, the nanofiltration pressure was 15 bar and the other nanofiltration conditions are presented in Table 13. The feed had DS of 8.7%. In the nanofiltration operation, the permeate and the concentrate (retentate) were recycled back to the feed vessel (constant feed).

The content of sucrose and betaine in the nanofiltration permeate are presented in Table 10.

TABLE 10

Conditions and composition of permeate in the nanofiltration

| Feed: 10% betaine, 88% sucrose on DS | | Mass fluxes, g/(m²h) | | Permeate composition, % on DS | |
|---|---|---|---|---|---|
| Temperature, °C. | Flux, l/(m²h) | Sucrose | Betaine | Sucrose | Betaine |
| 40 | 56 | 1270 | 500 | 67 | 26 |
| 60 | 74 | 1740 | 670 | 71 | 26 |

EXAMPLE 9

Chromatographic Separation of a Nanofiltrate

The permeate obtained from the nanofiltration of Example 8 was subjected to chromatographic fractionation to separate sucrose and betaine.

A pilot scale sequential SMB chromatographic equipment was used in the fractionation. The equipment consisted of 3 columns in series, a feed pump, circulation pumps and a pump for eluent water as well as inlet and product valves for the process streams. Each column had a height of 4.0 m and a diameter of 0.111 m. Columns were packed with a strong acid gel type cation exchange resin in $Na^+$ form, the mean particle size of the resin was 0.35 mm and DVB-content 5.5%. The temperature of the columns was 80° C. and water was used as eluent. Prior to chromatographic separation, the nanofiltrate had been concentrated to a dry substance content of 51.5%.

Chromatographic separation was carried out in 8-step sequence as follows (operations a, b and c take place simultaneously).

Step 1: Feed was pumped into column 1 and a dilution fraction was eluded from column 3

Step 2a: Feed was pumped into column 1 and a sucrose fraction was eluded from column 1

Step 2b: Water was fed into column 2 and a dilution fraction was eluded from column 3

Step 3a: Feed was pumped into column 1 and a sucrose fraction was eluded from column 1

Step 3b: Water was fed into column 2 and a betaine fraction was eluded from column 3

Step 4: Circulation in all columns

Step 5: Water was fed into column 3 and a sucrose fraction was eluded from column 2

Step 6: Circulation in all columns

Step 7: Water was fed into column 1 and a sucrose fraction was eluded from column 3

Step 8: Circulation in all columns

Volumes and flow-rate in different steps are shown in Table 7.

TABLE 11

Volumes (liters) and flow-rates (liters/h) in steps 1–8.

| | 1 | 2a | 2b | 3a | 3b | 4 | 5 | 6 | 7 | 8 |
|---|---|---|---|---|---|---|---|---|---|---|
| Feed | 2.0 | 2.0 | — | 4.0 | — | — | — | — | — | — |
| Dilution | 2.0 | — | 2.0 | — | — | — | — | — | — | — |
| Sucrose | — | 2.0 | — | 4.0 | — | — | 10.5 | — | 10.5 | — |
| Betaine | — | — | — | — | 9.0 | — | — | — | — | — |
| Circulation | — | — | — | — | — | 14.0 | — | 14.0 | — | 12.0 |
| Flow rate | 40.0 | 40.0 | 40.0 | 29.5 | 66.8 | 45.0 | 50.0 | 50.0 | 50.0 | 50.0 |

Steps 1 to 8 were repeated (5 to 7 times) until equilibrium was reached. The process was continued in the equilibrium state. Fractions were collected and analyzed with HPLC ($Na^+$-form resin, 0.8 ml/min, 0.002 M Na2SO4, 85° C.). The compositions of the feed and the fractions are shown in Table.

TABLE 12

Concentration and composition of the feed and the fractions collected.

| | Feed | Dilution | Sucrose | Betaine |
|---|---|---|---|---|
| Concentration g/100 ml | 63.7 | 6.9 | 13.5 | 12.7 |
| Sucrose % on DS | 71.9 | 19.2 | 97.4 | 1.8 |
| Betaine % on DS | 26.2 | 80.7 | 0.0 | 97.9 |
| Others % on DS | 1.90 | 0.1 | 2.6 | 0.3 |

The sucrose yield in the chromatographic separation was 99.4% and the betaine yield was 100.0%.

It will be obvious to a person skilled in the art that, as the technology advances, the inventive concept can be implemented in various ways. The invention and its embodiments are not limited to the examples described above but may vary within the scope of the claims.

What is claimed is:

1. A process of recovering betaine from a solution comprising betaine and sucrose, characterized by subjecting said solution to chromatographic fractionation and nanofiltration in any desired sequence and recovering a fraction enriched in betaine and optionally a fraction enriched in sucrose, followed by the recovery of betaine from said fraction enriched in betaine.

2. A process as claimed in claim 1, characterized in that the process comprises further chromatographic fractionation and/or nanofiltration steps to recover a further fraction or further fractions enriched in betaine and optionally a further fraction or further fractions enriched in sucrose and/or other product fractions, followed by the recovery of betaine from said further fraction or further fractions enriched in betaine.

3. A process as claimed in claim 1, characterized in that said chromatographic fractionation and/or nanofiltration steps are carried out successively in any desired sequence.

4. A process as claimed in claim 1, characterized in that said chromatographic fractionation and/or nanofiltration steps are carried out in parallel.

5. A process as claimed in claim 1, characterized in that the process comprises a combination of successive and parallel chromatographic fractionation and/or nanofiltration steps.

6. A process as claimed in claim 1, characterized in that the process comprises the following steps:
   (a) subjecting said solution comprising betaine and sucrose to chromatographic fractionation and recovering a fraction enriched in betaine and sucrose and optionally a residual fraction,
   (b) subjecting said fraction enriched in betaine and sucrose to nanofiltration and recovering a fraction enriched in betaine and optionally a fraction enriched in sucrose, followed by the recovery of betaine from said fraction enriched in betaine.

7. A process as claimed in claim 1, characterized in that the process comprises the following steps:
   (a) subjecting said solution comprising betaine and sucrose to nanofiltration and recovering a fraction enriched in betaine and optionally a fraction enriched in sucrose,
   (b) subjecting said fraction enriched in betaine to chromatographic fractionation and recovering a second fraction enriched in betaine and optionally a residual fractions, followed by the recovery of betaine from said second fraction enriched in betaine.

8. A process as claimed in claim 1, characterized in that the process comprises the following steps:
   (a) subjecting said solution comprising betaine and sucrose to chromatographic fractionation and recovering a fraction enriched in betaine and optionally a fraction enriched in sucrose and/or a residual fraction,
   followed by at least one of the following steps:
   (b) subjecting said residual fraction to nanofiltration and recovering a fraction enriched in sucrose and/or a fraction enriched in betaine and optionally one or more further fractions, followed by the recovery of betaine from said fraction enriched in betaine,
   (c) subjecting said fraction enriched in sucrose to nanofiltration and recovering a second fraction enriched in sucrose and/or a fraction enriched in betaine and optionally one or more further fractions, followed by the recovery of betaine from said fraction enriched in betaine,
   (d) subjecting said fraction enriched in betaine to nanofiltration and recovering a second fraction enriched in betaine and optionally one or more further fractions, followed by the recovery of betaine from said second fraction enriched in betaine.

9. A process as claimed in step (b) of claim 8, characterized in that said one or more further fractions comprise a fraction enriched in raffinose and/or a fraction enriched in colour compounds.

10. A process as claimed in claim 9, characterized in that said fraction enriched in raffinose is recovered as the nanofiltration retentate.

11. A process as claimed in claim 9, characterized in that said fraction enriched in colour compounds is recovered as the nanofiltration retentate.

12. A process as claimed in step (b) of claim 8, characterized by further recovering a nanofiltration permeate and returning the same to the chromatographic fractionation of step (a) to be used therein as the eluent.

13. A process as claimed in step (c) of claim 8, characterized in that said one or more further fractions comprise a fraction enriched in inositol, a fraction enriched in amino acids, a fraction enriched in monosaccharides or a fraction enriched in raffinose.

14. A process as claimed in claim 13, characterized in that said fraction enriched in raffinose is recovered as the nanofiltration retentate.

15. A process as claimed in step (d) of claim 8, characterized in that said one or more further fractions comprise a fraction enriched in sugars, a fraction enriched in inositol or a fraction enriched in amino acids.

16. A process as claimed in claim 1, characterized in that in the nanofiltration step of the process, the fraction enriched in betaine is recovered as the nanofiltration permeate.

17. A process as claimed in claim 1, characterized in that in the nanofiltration step of the process, the fraction enriched in sucrose is recovered as the nanofiltration retentate.

18. A process as claimed in claim 2, characterized in that said fraction enriched in betaine and/or said fraction enriched in sucrose and/or said one or more further fractions are subjected to one or more further nanofiltration and/or chromatographic fractionation steps.

19. A process as claimed in claim 6, characterized in that said residual fraction is enriched in salts.

20. A process as claimed in claim 1, characterized in that the chromatographic fractionation of the process is carried out using a column packing material selected from cation exchange resins.

21. A process as claimed in claim 20, characterized in that said cation exchange resin is a strongly acid cation exchange resin.

22. A process as claimed in claim 20, characterized in that said cation exchange resin is weakly acid cation exchange resin.

23. A process as claimed in claim 1, characterized in that the chromatographic fractionation is carried out using a column packing material selected from anion exchange resins.

24. A process as claimed in claim 23, characterized in that said anion exchange resin is a weakly basic anion exchange resin.

25. A process as claimed in claim 20, characterized in that said resin is in a monovalent metal form.

26. A process as claimed in claim 25, characterized in that said monovalent metal is predominantly $Na^+$ and/or $K^+$.

27. A process as claimed in claim 20, characterized in that said resin is in a divalent metal form.

28. A process as claimed in claim 27, characterized in that said divalent metal is predominantly $Ca^{2+}$.

29. A process as claimed in claim 20, characterized in that the resin has a styrene skeleton.

30. A process as claimed in claim 20, characterized in that the resin has an acrylic skeleton.

31. A process as claimed in claim 20, characterized in that said resin is crosslinked with divinylbenzene.

32. A process as claimed in claim 1, characterized in that in the chromatographic fractionation of the process, the column packing material is selected from a strongly acid cation exhange resin, which is predominantly in $Na^+$ and/or $K^+$ form and which has a styrene skeleton crosslinked with divinylbenzene.

33. A process as claimed in claim 1, characterized in that the chromatographic fractionation of the process is carried out as a batch process.

34. A process as claimed claim 1, characterized in that the chromatographic fractionation of the process is carried out as a simulated moving bed process.

35. A process as claimed in claim 6, characterized in that the chromatographic fractionation of the process is carried Out as a continuous simulated moving bed process.

36. A process as claimed in claim 8, characterized in that the chromatographic fractionation of the process is carried out as a sequential simulated moving bed process.

37. A process as claimed in claim 1, characterized in that the nanofiltration of the process is carried Out with a nanofiltration membrane selected from polymeric and inorganic membranes having a cut-off size of 100 to 2500 g/mol, preferably 150 to 1000 g/mol, most preferably 150 to 500 g/mol.

38. A process as claimed in claim 37, characterized in that the nanofiltration step of the process is carried out with a nanofiltration membrane selected from a four-layered membrane consisting of a polyester layer, a polysulfone layer and two proprietary layers, having a cut-off size of 150 to 300 g/mol, permeability (25° C.) of 5.4 l/($m^2$h bar) and $MgSO_4$-retention of 98% (2 g/l), a four-layered membrane consisting of a polyester layer, a polysulfone layer and two proprietary layers, having a cut-off size of 150 to 300 g/mol, permeability (25° C.) of 7.6 l/($m^2$h bar) and $MgSO_4$-retention of 96% (2 g/l), a membrane consisting of aromatic polyamide, having a permeability (25° C.) of 4.8 l/($m^2$h bar) and NaCl-retention of 45%, a sulfonated polyethersulfone membrane having a cut-off size of 500 to 1000 g/mol, permeability (25° C.) of 9.4/l($m^2$h bar) and NaCl-retention of 51% (5 g/l), and a polypiperazine membrane having a cut-off size of 200 g/mol, permeability (25° C.) of 7–8 l/($m^2$h bar) and NaCl-retention of 70%.

39. A process as claimed in claim 38, characterized in that the nanofiltration membrane is selected from a four-layered membrane consisting of a polyester layer, a polysulfone layer and two proprietary layers, having a cut-off size of 150 to 300 g/mol, permeability (25° C.) of 7.6 l/($m^2$h bar) and $MgSO_4$-retention of 96% (2 g/l), and a sulfonated polyethersulfone membrane having a cut-off size of 500 to 1000 g/mol, permeability (25° C.) of 9.4 l/($m^2$h bar) and NaCl-retention of 51% (5 g/l).

40. A process as claimed in claim 1, characterized in that said solution comprising betaine and sucrose is a sugar beet-derived solution.

41. A process as claimed in claim 40, characterized in that said sugar beet-derived solution is a molasses solution.

* * * * *